(12) United States Patent
Tauro et al.

(10) Patent No.: US 11,721,094 B2
(45) Date of Patent: Aug. 8, 2023

(54) MILK ANALYSER FOR CLASSIFYING MILK

(71) Applicant: Foss Analytical A/S, Hilleroed (DK)

(72) Inventors: Sandeep Christopher Tauro, Hilleroed (DK); Samarth Barthwal, Hilleroed (DK); Sara Zollfrank Sparre, Hilleroed (DK)

(73) Assignee: Foss Analytical A/S, Hilleroed (DK)

( * ) Notice: Subject to any disclaimer, the term of this patent is extended or adjusted under 35 U.S.C. 154(b) by 224 days.

(21) Appl. No.: 17/278,897

(22) PCT Filed: Oct. 11, 2019

(86) PCT No.: PCT/IB2019/058694
§ 371 (c)(1),
(2) Date: Mar. 23, 2021

(87) PCT Pub. No.: WO2020/095131
PCT Pub. Date: May 14, 2020

(65) Prior Publication Data
US 2022/0051389 A1    Feb. 17, 2022

(30) Foreign Application Priority Data
Nov. 7, 2018   (DK) .............................. PA201800836

(51) Int. Cl.
*G06K 9/00*     (2022.01)
*G06V 10/82*    (2022.01)
(Continued)

(52) U.S. Cl.
CPC ........ *G06V 10/82* (2022.01); *G06F 18/24133* (2023.01); *G06N 3/02* (2013.01);
(Continued)

(58) Field of Classification Search
None
See application file for complete search history.

(56) References Cited

U.S. PATENT DOCUMENTS

| 6,571,731 B1 * | 6/2003 | Maier, Jr. .............. A01J 5/0137 |
| | | 119/14.08 |
| 2008/0259351 A1 * | 10/2008 | Wiethoff ............... A01J 5/0134 |
| | | 356/600 |

(Continued)

FOREIGN PATENT DOCUMENTS

| EP | 0983378 A1 | 3/2000 | |
| EP | 1892043 A2 * | 2/2008 | ............. B01L 3/508 |

(Continued)

OTHER PUBLICATIONS

Kobek, Jacklyne Atieno. Vision based model for identification of adulterants in milk. Diss. Strathmore University, 2017. (Year: 2017).*

(Continued)

*Primary Examiner* — Avinash Yentrapati
(74) *Attorney, Agent, or Firm* — Harness, Dickey & Pierce, P.L.C.

(57) ABSTRACT

A milk analyser comprising a milk analysis unit having an analysis modality wherein the milk analysis unit further comprises a milk classification system having an imaging device configured to image milk for generation of digital image data; a processor of a computing device which is adapted to execute a program code to implement a deep learning neural network classifier trained using labelled milk images from milk within the classes into which the imaged milk may be classified and operable to generate a classification of the imaged milk; and a controller configured to output a control signal in dependence of the generated classification to control a sample intake to regulate the supply of milk to the analysis unit.

18 Claims, 6 Drawing Sheets

(51) Int. Cl.
    *G06V 10/44*      (2022.01)
    *G06N 3/02*       (2006.01)
    *G06T 1/00*       (2006.01)
    *G06T 7/00*       (2017.01)
    *G06F 18/2413*    (2023.01)
    *G06V 10/764*     (2022.01)
    *G06V 20/68*      (2022.01)

(52) U.S. Cl.
    CPC .......... *G06T 1/0007* (2013.01); *G06T 7/0004* (2013.01); *G06V 10/454* (2022.01); *G06V 10/764* (2022.01); *G06T 2207/30128* (2013.01); *G06V 20/68* (2022.01)

(56) References Cited

U.S. PATENT DOCUMENTS

| | | |
|---|---|---|
| 2017/0016813 A1 | 1/2017 | Wagner |
| 2018/0247195 A1 | 8/2018 | Kumar et al. |
| 2019/0384990 A1* | 12/2019 | Kim .................. G06V 20/52 |

FOREIGN PATENT DOCUMENTS

| | | |
|---|---|---|
| SU | 1372228 A1 | 2/1988 |
| WO | WO-9850577 A1 | 11/1998 |
| WO | WO-2008093344 A1 | 8/2008 |
| WO | WO-2017201540 A1 | 11/2017 |
| WO | WO-2018165605 A1 | 9/2018 |

OTHER PUBLICATIONS

International Search Report PCT/ISA/210 for International Application No. PCT/IB2019/058694 dated Nov. 26, 2019.

Written Opinion of the International Searching Authority PCT/ISA/237 for International Application No. PCT/IB2019/058694 dated Nov. 26, 2019.

Da Cruz A G et al., "Monitoring the authenticity of low-fat yogurts by an artificial neural network", Journal of Dairy Science, American Dairy Science Association, US, vol. 92, No. 10, Oct. 31, 2009 (Oct. 31, 2009), pp. 4797-4804.

* cited by examiner

MILK ANALYSER FOR CLASSIFYING MILK

CROSS-REFERENCE TO RELATED APPLICATIONS

This application is a National Stage of PCT/I62019/058694, filed on Oct. 11, 2019, which claims priority to Danish Patent Application PA201800836, filed on Nov. 7, 2018 in the Danish Patent and Trademark Office, the entire contents of each of which are incorporated herein in their entirety.

BACKGROUND

The present invention relates to a method of and systems for classifying milk and to a milk analyser employing the same.

Bad milk is milk that is unintentionally soured, curdled, contains foreign matter or is otherwise spoiled. There are various reasons that can cause bad milk. They include improper cleaning of species (cows, goat, sheep etc.) before and after milking, sick species and lack of control over or malfunction of transportation conditions. Proteins can be degraded by enzyme action or by exposure to light. The predominant cause of protein degradation is through enzymes called proteases. Undesirable degradation (proteolysis) results in milk with off-flavours and poor quality. Bad milk often manifests in the form of small clusters or blobs, which can then be used for visual classification. In addition, extreme temperature cycling either during storage or transportation, unclean containers, incorrect amount of preservative, dilutant or other additive introduced to the milk before being sent to a Central Milk Testing (CMT) or other laboratories or an analyser accelerate the degradation.

However caused, bad milk samples inevitably reach CMT and other laboratories or analysis locations for analysis in more or less automated analysis instruments. As these bad milk samples are normally not visually scrutinized prior to analysis they become a part of routine sample workflow which then consists of a mix of good and bad milk samples. However, when these bad milk samples are put through the analysis instrument they can cause a significant blockage issue in the instruments. In some cases, the instruments can be out of use for days which may have a severe impact on the operation of the laboratory. Depending on the nature and/or degree of 'badness' of the bad milk samples, they could either cause a simple issue such as a block in the intake part of the analysis instrument such as a pipette, or can block more intricate parts deep within the instrument.

At times, a blocked pipette can be cleaned by an automatic cleaning routine, but this is not always the case. If the automatic cleaning routine is not able to do a proper cleaning, then the operator has to use mechanical tools to clean the intake system. This is also true if the blockage occurs deeper within the analysis instrument and addressing any such blockage can be difficult as well as time consuming. Such blockages can lead to significant downtime which lowers the throughput of the affected analysis instrument and increases operational costs for the CMT laboratory. Moreover, the normal workflow after a blockage is to execute various measurement checks to confirm that the cleaning is thorough. These check measurements increase the cost of operation of the instrument for the laboratory as extra samples such as standards and check samples are used to verify the effectiveness of cleaning before putting it back into service.

Often bad milk has not only distinct visual appearances but also distinct olfactory characteristics. However, this is not always the case and detection of bad milk or of milk having other characteristics, particularly unwanted characteristics, that manifest themselves visually may prove difficult. For example for the visually impaired or where the visual manifestations are subtle, discernible perhaps only to a well-trained individual, such as on the farm where a farmer would benefit from a knowledge of certain milk characteristics before the milk is loaded onto a transport tanker or at a consumer where it would be useful to identify bad milk before consumption.

SUMMARY

According to the present invention there is provided a milk analyser comprising a milk analysis unit having an analysis modality wherein the milk analysis unit further comprises a milk classification system having an imaging device configured to image milk for generation of digital image data; a processor adapted to execute a program code to implement a deep learning neural network classifier trained using labelled milk images from milk within classes into which the imaged milk may be classified according to class characteristics which are manifest visually in the imaged milk and operable to generate a classification of the imaged milk; and a controller configured to output a control signal in dependence of the generated classification to control the supply of milk to the analysis unit.

In some embodiments the sample intake comprises a sorter adapted to separate a sample from other samples of an array of samples dependent on the signal output from the output device indicating a predetermined class, which predetermined class may be the same as or different from the predetermined class on which the operation of the sample intake is dependent.

The computer implemented method of classifying milk, may comprise the steps of:
  implementing in a processor, which processor may comprise one or more interoperable processing units, a first deep learning neural network classifier trained using a training data set comprising digital representations of milk images wherein each image is labelled with a milk class to which it belongs;
  obtaining into the processor digital image data comprising a representation of milk to be classified; and
  processing in the processor the digital image data using the implemented first deep learning neural network classifier to generate a classification for milk represented in the digital image data as belonging to a class in the set of classes.

In some embodiments the digital image data is processed using the implemented first deep learning neural network to extract a feature vector for the digital image data; to determine for the extracted feature vector the probability for each class of the set of classes of the feature vector belonging to that class and generating the classification dependent on the determined probabilities.

In some embodiments the deep learning neural network classifier is adapted to classify the milk as belonging to one of the classes 'GOOD' and 'BAD' or similar monikers indicating whether or not the milk has undesirable characteristics. In other embodiments the deep learning neural network classifier may be adapted to classify milk in to different or additional classes, such as may be 'foreign object', 'foreign object type', 'clumping', or colour and the milk may be classified as belonging to a one or more of the classes of the deep learning neural network classifier.

In some embodiments the deep learning neural network classifier comprises one or more layers trained to determine one or both the presence of a sample container and the presence of a milk sample in the image data and the method comprises generating the classification of the milk sample dependent on the determined presence of a milk sample in the image data. The deep learning neural network classifier may contain one or more layers trained to classify from the image data a sample container as holding sufficient or insufficient milk sample.

In some embodiments the deep learning neural network classifier may be generated using either transfer learning. In some embodiments the deep learning neural network classifier may comprise a convolutional neural network ('CNN'). In some embodiments the deep learning neural network classifier may be generated using a deep belief network or other layered neural network architecture in which the input of one layer is the output of a preceding layer.

Deep learning models require a substantial amount of training instances to avoid over-fitting. As such deep learning requires a substantial amount of training image data and the investment of a substantial amount of time. To reduce this burden transfer learning may usefully be employed, particularly where the number of training images is limited. Transfer learning is a machine learning method where a model developed for one task is re-used as the starting point for a model which is to be used for a second task. In the context of the present invention the deep learning model is first trained on a large number of irrelevant labelled ('classified') images, unrelated to milk images, to construct a classifier. A training data set of labelled milk images (each labelled image also referred to as "training image data") is then provided where each image is labelled as belonging to one or more classes and the deep learning model is further trained using the training data set in order to modify the classifier to be useful in identifying the classes related to the training data set.

In a CNN lower convolutional layers capture low-level image features while higher convolutional layers capture more and more complex image details, the final number of layers being set by the complexity of image detail required in order to identify the required number of classes. CNN architectures in general consist of convolutional and pooling (or subsampling) layers, which are grouped into modules or blocks. Either one or more fully connected layers, as in a standard feedforward neural network, follow these CNN modules. Modules are stacked on top of each other to form a deep model. An image is input directly to the network, and this is followed by several stages of convolution and pooling in the CNN modules. Thereafter, representations from these operations feed one or more fully connected layers. Finally, the last fully connected layer outputs the class label. The convolutional modules serve as feature extractors, and thus they learn the feature representations of their input images. The neurons in the convolutional layers which comprise the convolutional modules are arranged into feature maps. Each neuron in a feature map has a receptive field, which is connected to a neighborhood of neurons in the previous layer via a set of trainable weights. Inputs are convolved with the learned weights in order to compute a new feature map. The purpose of the pooling layers is to reduce the spatial resolution of the feature maps and thus achieve spatial invariance to input distortions and translations. Typically average pooling aggregation layers may be employed that propagate the average of all the input values, of a small neighborhood of an image to the next layer. Alternatively max pooling aggregation layers may be employed that propagate the maximum value within a receptive field to the next layer. The fully connected layers that follow these layers interpret the abstract feature representations extracted by the modules and perform the function of high-level reasoning and classification and are often realized as a support vector machine or are configured to implement a Softmax application function.

In some embodiments the digital image data represents a monochrome (or at least reduced colour information) image, which monochrome colour or a reduced colour palette may be selected to enhance visibility of relevant features in the image (i.e. those contributing to the classification).

In some embodiments the digital image data may represent an image obtained from transmission of light through a layer of milk.

In some embodiments the input device may be for example a scanner adapted to convert a recorded image of a milk sample into a digital representation, may be a video camera, such as a digital video camera, and frame grabber adapted to convert a single frame of a moving image containing a milk sample into a digital representation or may be a digital stills camera, adapted to generate a digital representation of a sample of milk located in its field of view. In some embodiments the input device may comprise a communications interface configured to access remotely generated digital image data over a network such as, without limitation, a telephone network a local area network or the internet either via a fixed wired link, wirelessly or a combination of the two and provide the remotely generated digital image data as an input to the deep learning network classifier.

In some embodiments a detector may be employed to detect the presence of a milk sample in a field of view of a digital camera, which digital camera is adapted to acquire digital image data dependent of the detector detecting the presence of a milk sample. In some embodiments the detector may be an interruption type detector in which the interruption of a beam of light passing between an emitter and a detector by a sample container will generate a signal indicative of the presence of the sample container useable to trigger the acquisition of a milk image for the generation of digital image data.

Although some aspects of embodiments of the present invention are summarised above it will be appreciated that this summary is not intended to limit the present invention, the scope of which is to be properly determined by the appended claims.

BRIEF DESCRIPTION OF THE DRAWINGS

Exemplary embodiments comprising the present invention are described in greater detail below with reference to the drawings of the accompanying figures, of which.

DETAILED DESCRIPTION

It will be appreciated that the scope of the invention is not limited to the configurations, components and method steps illustrated and discussed below. Rather, these are disclosed only as examples falling within the scope of the appended claims.

Figure 1:
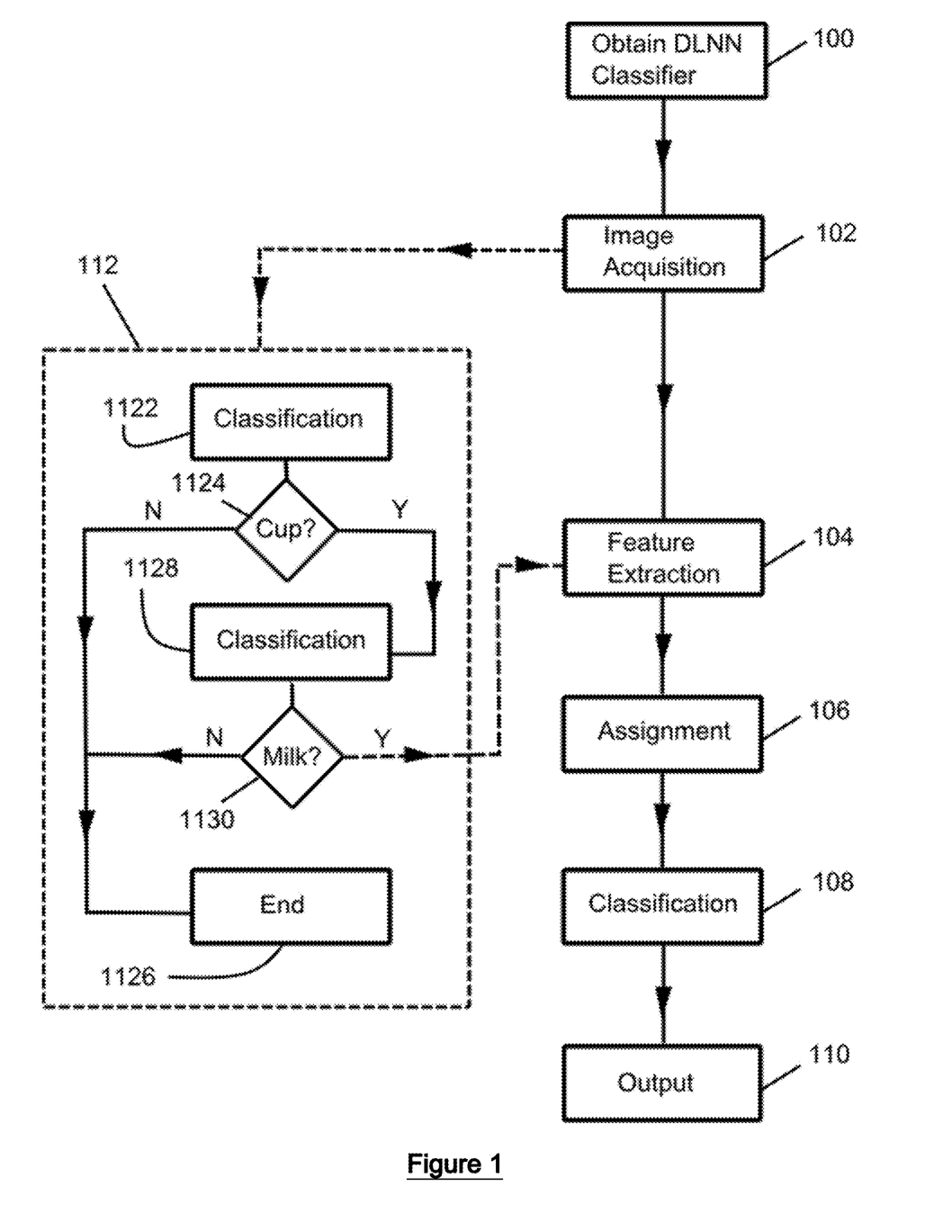
FIG. 1 illustrates an exemplary method of classifying milk in a milk analyser according to the present invention.

In FIG. 1, an embodiment of method of classifying milk according to the present invention is illustrated. The method comprises a model implementation step 100 at which step program code is accessed and executed by a processor of a computing device to implement a deep learning neural network (DLNN) classifier in the processor. The DLNN classifier that is thus obtained into the processor is a classifier that has been trained to extract a feature vector from digital image data comprising a representation of imaged milk to be classified and to determine from the extracted feature vector a probability for each class of a set of classes of any milk represented in the digital image data belonging to that class. Each class of the set of classes indicates a property of milk. At an acquisition step 102 digital image data comprising a representation of a milk sample is obtained into the processor. At a feature extraction step 104 the digital milk image data is processed in the processor using the obtained DLNN classifier to extract a feature vector for the digital milk image data. At an assignment step 106 the extracted feature vector is processed in the processor using the obtained DLNN classifier to determine a probability for each class of the set of classes of the extracted feature vector belonging to that class. At a classification step 108 the determined probabilities are processed in the processor using the obtained DLNN classifier to generate a classification for the milk sample represented in the digital image data as belonging to a class of the set of classes dependent on the determined probabilities. At an output step 110 a signal is generated representing the classification and is output for use external of the processor.

In some embodiments and illustrated in FIG. 1, the method further comprises an advantageous but not essential confirmation step 112 at which the digital image data acquired at the acquisition step 102 is processed to classify the image as including or not a milk sample before the image is processed 104, 106 to classify the milk sample itself 108. In some embodiments different digital image data than that acquired at the acquisition step 102 may be employed, provided that this other digital image data represents an image of the same milk sample as is represented by the digital image data acquired 102 above, but taken under other conditions. It will be appreciated that these conditions may be for example a different view point, different exposure times or different illumination conditions, each selected to provide digital image data best suited for the further processing steps described below.

At this confirmation step 112 a sub-step 1122 of object detection is performed. At this object detection sub-step 1122 digital image data is input into a classifier, preferably a DLNN classifier, that has been trained to identify the presence or absence of a representation of a sample container in the input digital image data and which is implemented in the processor. The DLNN classifier that is employed at this sub-step 1122 may in some embodiments be that implemented to classify milk at the implementation step 100 above or in other embodiments may be a separate DLNN classifier.

At this object detection sub-step 1122 the DLNN classifier operates to extract features related to a sample container represented in the digital image data and to generate an appropriate feature vector. At a decision sub-step 1124 the feature vector extracted at object detection sub-step 1122 is processed to determine the presence or absence of a representation of a sample container in the digital image data. If not present, illustrated by branch N at decision sub-step 1124, then no processing of digital image data (steps 104-110) to classify milk needs be performed and the method is terminated at termination sub-step 1126.

If a sample container is present, illustrated by branch Y at decision sub-step 1124 then the method continues to a second object detection sub-step 1128.

At this second object detection sub-step 1128 digital image data is input into a classifier, preferably a DLNN classifier, that has been trained to identify the presence or absence (in some embodiments additionally or alternatively an amount) of a representation of milk in the input digital image data and which is implemented in the processor. The DLNN classifier that is employed at this sub-step 1128 may in some embodiments be that implemented to classify milk at the implementation step 100 above, in other embodiments may be a separate DLNN classifier and in other embodiments may be the same DLNN classifier as employed in the detection of a sample container at object detection sub-step 1124. An advantage of employing different DLNN classifiers to classify milk, to detect a sample container and to detect milk in digital image data is that each DLNN classifier may be trained specifically to perform an individual classification task and thus may be better optimised to perform that task.

At this second object detection sub-step 1128 the DLNN classifier operates to extract features related to milk represented in the digital image data and to generate an appropriate feature vector. At a second decision sub-step 1130 the feature vector generated at the second object detection sub-step 1128 is processed to determine the presence or absence of a representation of milk in the digital image data. If not present, illustrated by branch N at the second decision sub-step 1130, then no processing of digital image data (steps 104-110) to classify milk needs be performed and the method is terminated at termination sub-step 1126.

If milk is present, illustrated by branch Y at the second decision sub-step 1130, then the method continues (steps 104-110) to implement the classification of milk represented in the digital milk image data acquired at step 102.

By employing the optional confirmation step 112 unnecessary image processing and classification is avoided thus reducing processing and time overheads. In some embodiments further reduction in processing and time overheads may be obtained by omitting the sample container detection steps 1122, 1124 as no milk classification may be performed in the absence of a representation of milk in the digital image data.

An example of a DLNN classifier 200 which is implemented in one or more processors and which is useable in the method according to the present invention, for example that method described with reference to FIG. 1, will now be described in greater detail with reference to FIG. 2. The exemplary DLNN classifier 200 comprises an extractor 202 which is realised in the present embodiment using a convolutional neural network (CNN) architecture; an input 204 preceding the extractor 202; and an output 206 following the extractor 202. During classification data in the DLNN classifier 200 flows in a forward direction from input 204, through the extractor 202 and to the output 206.

In the present example the input 204 is configured to transform an image 208 into a matrix M holding digital image data and provide this to the extractor 202. Each cell of the matrix M receives and holds a different pixel intensity value of the input image 208. Thus an input image of say 720 pixels wide by 480 pixels high will require a matrix M of size 720×480. When the input image 208 is a colour image then each pixel may be represented by three intensity values: a red, a green and a blue intensity value and in some embodiments (as shown in FIG. 2) the matrix M will therefore be 720×480×3 cells, where 3 is the number of channels here a Red channel, a Green channel, and a Blue channel. In some embodiments the image may be a hyperspectral image and the matrix will necessarily have more than three channels in order to have the image represented. In some embodiments the input 204 may also be configured in a known manner to also perform image processing, such as for example image re-sizing to ensure that every matrix M provided to the extractor 202 will the same amount of data or colour modification in order to enhance certain features in the image.

The extractor 202 comprises a number (here two illustrated) of hidden convolutional modules C1, C2 which operate in a manner well known in the art to extract features from the input digital image data held in the matrix M and form a feature vector F for propagation to the output 206. In the present example the hidden convolutional module C1 processes the input digital image data in the matrix M propagated from the input 204 by convolving each channel in turn with a weighted filter WF1 (in some embodiments, weighted filters) to generate a feature map FM1 (in some embodiments feature maps) which essentially is a map of the location(s) of the associated feature in the image represented by the input digital image data. If more than one feature is to be extracted then different weighted filters, each trained to extract a feature of interest, is convolved with the input digital image data in the propagated matrix M to generate a corresponding feature map. The (or each) feature map is then propagated to a pooling layer P1 which processes the feature map to provide a down-sampling aggregation over space and generates an associated reduced feature map RFM1 having a spatial invariance to input distortions and translations. This reduced feature map (or maps) is, in the present example, propagated to a next hidden convolutional module C2 whereat this reduced feature map from the previous convolutional module (here C1) is processed by convolution with one or more other weighted filters WF2, WF3 and the resulting one or more feature maps FM2 is processed in a pooling layer P2, similar to the pooling layer P1 described above to generate a new reduced feature map RFM2. The new reduced feature map RFM2 generally mapping higher level features in the digital image data from the input 204.

In some embodiments, and as known in the art, one or more of the hidden convolutional modules C1, C2 may comprises other layers provided to improve robustness of the model, such as layers, so-called 'activation functions' to provide non-linearisation for example Rectified Linear Unit (ReLU) layers which operate to convert negative values to zero and/or normalisational layers which may provide a whitening or a lateral inhibition.

The features of the final reduced feature map, here feature map RFM2, generated after processing by all convolutional modules C1,C2 are then concatenated in a final layer of this CNN based extractor 202 to generate a feature vector F which is propagated to the hidden label prediction layer L of the output 206. The label prediction layer L comprises one or more layers of fully connected nodes and which also may include activation functions. Each node of one layer is connected to every node of the previous layer by an individually weighted connection and each node may be individually biased. In some embodiments additional training image data may be employed to update these weights and/or biases in order to improve prediction of the DLNN classifier 200.

The label prediction layer L functions to generate an n dimensional vector, where n is the number of possible classes into which the input image 208 might be classified (in the present embodiment two possible classes GOOD/BAD). Each number in this n dimensional vector represents the probability that the image 208 (or portions thereof) belong to a particular class of the n classes. This label prediction layer L might, by way of example, be configured to use a so-called "SOFTMAX" activation function or configured as a so-called Support Vector Machine (SVM) in order to derive these probabilities. In the present embodiment an output $O_1, O_2$ for each possible class is populated with the probability score in the n-dimensional vector. These outputs $O_1$ and $O_2$, or in some embodiments just the output having the highest probability is configured to be accessible external of the DLNN classifier 200, for example for use in the generation of one or more dependent messages for display on a display screen or in the generation of a control signal for controlling the operation of external devices to divert a milk sample.

It will be appreciated that networks other than convolutional processing may be employed in order to extract feature information from the input image 208. Deep belief networks, for example, which are stacked layers of restricted Boltzman machines, may be employed to perform this function, as may autoencoders and general adversarial networks.

Figure 2:
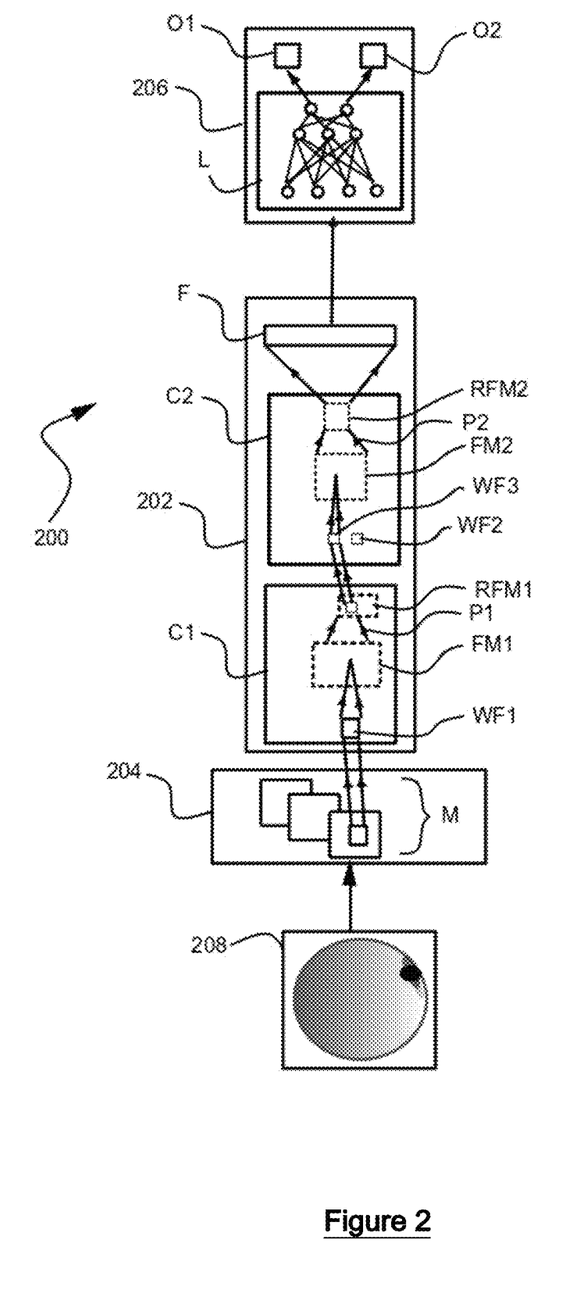
FIG. 2 illustrates schematically a DLNN classifier used in the method of FIG. 1.

The deep learning neural network classifier of the present invention, for example the DLNN classifier 200 of FIG. 2, may be trained (or re-trained) by transfer learning in order to generate the weighted filters of the convolutional modules C1,C2. The weights and/or biases of each connection of the label prediction layer L may additionally or alternatively be retrained in this manner. Typically, the weighted filters of the convolutional modules C1,C2 remain fixed and it is the weights and/or biases of the connections in the label prediction layer L that are adjusted during subsequent fine-tuning, as will be described below.

By way of example only, training of the deep learning neural network classifier will be described with reference to the classification of milk samples in to two classes only, for example GOOD or BAD, but it will be appreciated that the classifier may be trained to classify milk samples as belonging to one or more of any number of classes provided that class characteristics are manifest visually in an image of the milk.

The deep learning neural network classifier, for example the DLNN classifier 200, may be trained without the benefit of previous data or information (i.e., from scratch) or may be fine-tuned depending on the size of the training set in the application domain. The deep learning neural network classifier may be trained in two phases. During an initialization training phase, a very large set of images with a variety of subjects unrelated to milk may be fed to the deep learning neural network classifier as training data. For example, images from, say, the ImageNet collection may serve to initialize the weighted filters and the weights and biases of the deep learning neural network classifier. As a tuning phase of training, specialized images of milk samples containing expected abnormalities, and annotated as such (the training image data), may be fed to the deep learning neural network classifier as training data. The training data may include a set of images of milk samples that are known to have no anomalies, and annotated as such. A label may be defined for the entire training image based on the presence of any anomalous parts in an image, which can be easily obtained in real-time without extensive labelling effort. The anomalous regions in the training images need not be defined, segmented or outlined. An adequate training image may be defined as having at least one anomalous pixel. Each training image may be labelled or annotated as and stored prior to training of the DLNN classifier. For example, a training image of a milk sample having anomalous regions may be annotated as "BAD" and a training image of a milk sample having no anomalous regions may be annotated as "GOOD". By the application of image-level based annotation, the training process is greatly streamlined and can be completed with reduced effort. The training data with image-level labels may consist of a substantial number of samples, such as several hundred samples, for each class with image-level labels. Images selected for the training data with bounding box labels may consist of a smaller number of samples, such as around 20 images for each class, with bounding boxes enclosing key markers in the image that are helpful for detecting the abnormalities. Image patches may be cropped from the sample images of each class, and may be labelled to include the markers with the same image-level class label corresponding to the image from which the patches are cropped. The image patches may be resized to match the size of the original image. Once all sets of training data images have been generated and resized, the deep learning neural network classifier may be trained by applying training data. The DLNN classifier 200 may be trained using known transfer learning methodologies, here the training data is applied as a re-training or 'tuning' following the initialization training phase of the deep learning neural network classifier by one of the publically available training data sets, for example ImageNet; Open Images or Microsoft Common Objects in Context. Typically the weighted filters learned during this initialisation training phase remains fixed and only the connection weights and biases between the nodes of the layers in the label prediction layer L may be subsequently altered during the refinement or 'tuning' training phase. The training dataset of labelled milk images may be expanded or replaced with other labelled milk images and applied to an existing DLNN milk classifier to re-train or improve the training of it.

In some embodiments one or more additional DLNN classifiers may be employed which are each separately trained to identify additional related features in an input image. These additional features are separate from those employed in the DLNN classifier 200 to make the milk classification and whilst the DLNN classifier 200 may be trained to also make these identifications it is often more flexible and more reliable to train a DLNN classifier for one purpose. In the present embodiment and with reference to optional confirmation step 112 of FIG. 1 two additional DLNN classifiers may be implemented, one to determine the presence or absence of a sample container (step 1122) and one to determine the presence or absence (even the presence of a sufficient amount) of milk (step 1128). Each additional DLNN classifier may be configured and trained in a manner analogous to the configuration and the training described above in respect of the DLNN classifier 200 and may be configured to operate in series with the DLNN classifier 200, configured to classify the milk with the subsequent DLNN classifier in the series being configured to operate in the dependence of a classification made by the immediately preceding DLNN classifier in the series. Thus, and according to the exemplary method of FIG. 1, a first DLNN classification (step 1122) of the image 208 is made to determine the presence or absence of a sample container. A second DLNN classifier is triggered to perform a classification if the first classifier determines the presence of a sample cup (step 1124). A second DLNN classification (step 1128) of the image data is then made to determine the presence or absence of milk in the input image 208 and in the event milk is present (step 1130) the operation of the DLNN classifier 200 is triggered to make a classification of the milk in the image 208. In other embodiments input digital image data representing one or more separate images may be propagated to the extractor of the appropriate DLNN classifier.

Figure 3:
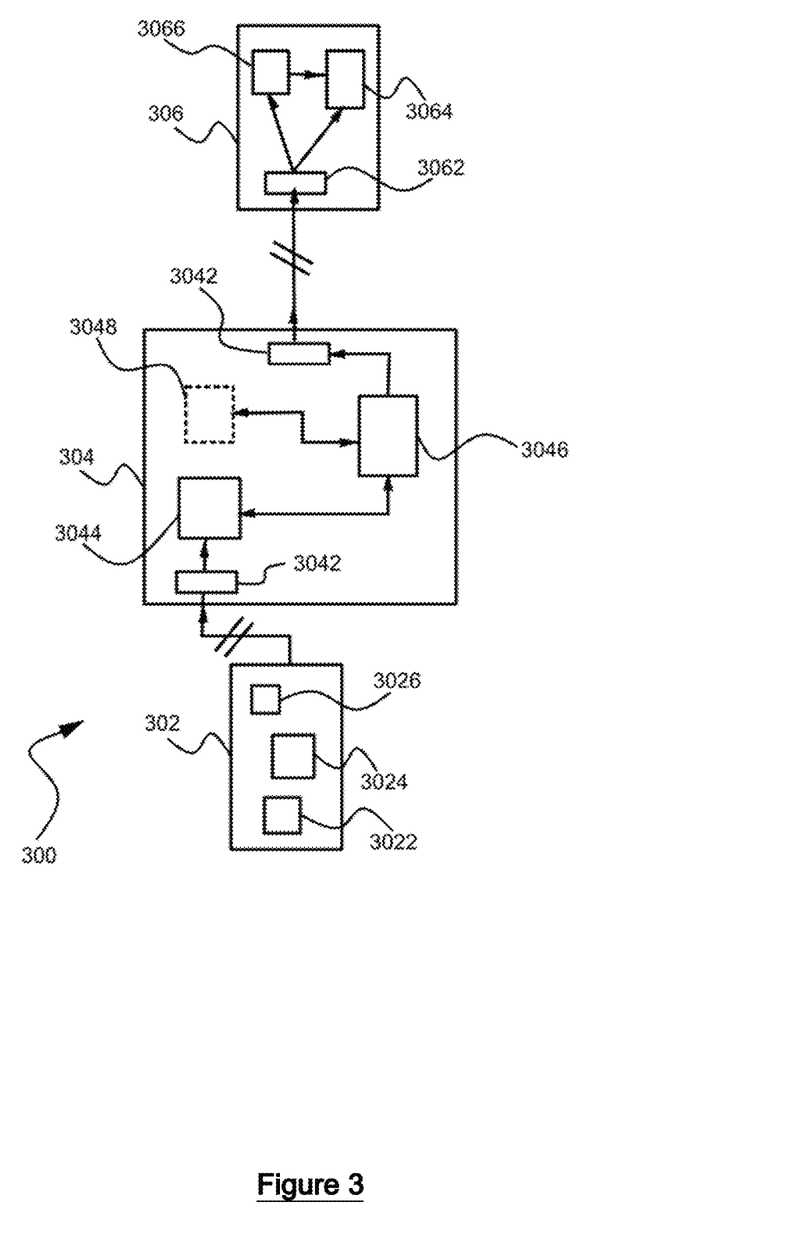
FIG. 3 illustrates a milk classification system for classifying milk in a milk analyser according to the present invention.

An embodiment of a milk classification system 300 according to the present invention, suitable for implementing the DLNN classifier 200 of FIG. 2, for classifying milk represented in digital image data as belonging to a class amongst a plurality of classes is illustrated schematically in FIG. 3.

The system 300 comprises an input device 302 a computing device 304 and an output device 306.

The input device 302 is configured to generate a digital representation of an image of a milk sample 208 and to provide this representation for processing in the computing device 304.

In some embodiments the input device 302 comprises a digital camera or other detector arrangement 3022, optionally including conditioning optical elements (such as lenses and filters) adapted to generate digital images of milk samples that may be located at an imaging stage 3024 within a field of view of the digital camera or detector arrangement 3022. The imaging stage 3024 in some embodiments may be a region in space through which a milk sample will be placed or transported, for example on a moveable belt or track or sprayed or otherwise flowed through free space, or may be a holder on which a milk sample is secured or placed. Optionally the input device 302 may include an illumination source 3026 adapted to illuminate samples located at the imaging stage 3024. The conditioning optics and/or the illumination source 3026 may be adapted to ensure that only light within a certain wavelength range reaches the detector (of the camera or the detector arrangement), for example by ensuring that light of that wavelength range illuminates the sample through judicious choice of filters and/or emission wavelengths emitted by the illumination source 3026. This selection of only a limited wavelength range may also be achieved through suitable post acquisition processing of the digital image data to remove information from the acquired image which is unrelated to the wavelength region of interest. In some embodiments the illumination source 3026 and the camera/detector arrangement 3022 may be orientated relative to the imaging stage 3024 such that only light transmitted through the a sample at the imaging stage 3024 is detected by the camera/detector arrangement 3022, in other embodiments the configuration may be such that light reflected from the sample is detected and in still other embodiments the configuration may be such that separate images are generated for each of transmitted and reflected light.

In some embodiments the input device 302 may be a conventional digitiser, such as a flatbed scanner, which is adapted to transform a paper copy of an image of a milk sample into a digital representation of that image.

In some embodiments the input device 302 may comprise a storage device and reader. The storage device is adapted to store digital images of milk samples on tangible computer readable media and may for example comprise a CD-ROM or other optical storage media, a USB or other solid state memory device or remote mass media storage devices realised on one or more servers. The reader is configured to access the storage device and to obtain a digital image of a milk sample stored on the device for propagation as digital image data to the computing device 304.

The computing device 304 comprises one or more communications interfaces 3042 for one or both receiving data into and transmitting data out of the computing device 304; a processor 3044 which may comprise one or more processing units such as, for example, one or more of a dedicated microprocessor, a conventional single- or multi-core computer processing unit (CPU), a suitably adapted graphical processing unit (GPU) or a neural processing unit (NPU); a system memory 3046, and optionally an internal or a remotely accessible storage device 3048.

Program code is, in the present embodiment, loaded into the system memory 3046 for execution by the processor 3044. This program code may be stored temporarily or permanently in the system memory 3046; may be made accessible to the system memory 3046 (or directly to the processor 3044) from the internal or external storage device 3048, if present; or may be stored in part internal of the computing device 304 and in part external of the computing device 304. Externally stored program code has an advantage that re-training or further training of the DLNN classifier, for example the DLNN classifier 200 illustrated in FIG. 2, may be performed centrally and a same new model deployed to one or more computing devices 304 of one or more milk classification systems 300.

The program code contains instructions which, when run on the one or more processor units of the processor 3044, causes the processor 3044 to implement the DLNN classifier, such as that DLNN classifier 200 described above, according to the present invention. Specifically in the present embodiment, when the program code is executed by the one or more processing units of the processor 3044 the computing device 304 is transformed into a special purpose computer configured to perform the tasks described herein in respect of the extractor 202, the input 204 and the output 206 of the DLNN classifier 200. That is, digital image data generated by the input device 302, with or without suitable pre-processing to obtain a desired data format, is made available via the communications interface 3042 either directly to the processor 3044 or indirectly to the processor 3044 via the system memory 3046; the processor 3044 acts on this digital image data to process it via the implemented DLNN classifier so as to generate a classification of the milk sample based on the input digital image data; and to make the generated classification externally available, here via communications interface 3042. Some or all of the probabilities of the milk sample belonging to the other classes available to the DLNN classifier may also be made externally available via the communications interface 3042, these other probabilities being also determined in the classification process implemented by the processor 3044.

The output device 306 of the present embodiment comprises a communications interface 3062, a display device 3064 and a control signal generator 3066. The digital information made externally available via the communications interface 3042 of the computing device 304 (i.e. the classification of milk sample depicted in the image obtained by the input device 302 and optionally the probabilities of the milk sample belonging to some or all of the classes available to the DLNN classifier (as determined by the programmed processor 3044) is received into the output device 306 via its communications interface 3062. The control signal generator 3066 receives the digital information from the communications interface 3062 and generates a signal in dependence of this to, for example and illustrated in the present embodiment, drive the display device 3064 to display information relevant to the milk sample classification which was generated by the DLNN classifier implemented by the processor 3044. Such displayed information may be simply the classification itself (for example alternative binary classifications such as "GOOD" or "BAD" or "SUITABLE" or "UNSUITABLE") or may be instructions to an operator relevant to the classification (for example "REMOVE SAMPLE" if the sample is classified as being "BAD" or "UNSUITABLE"). In some embodiments the display device 3064 may be a series of lights, such as red light for "BAD" and green light for "GOOD" which separately illuminate depending on the control signal. In some embodiments the display device 3064 may be a sound generator to display the results of the classification audibly.

Additionally or alternatively the control signal generator 3066 may be configured to generate a control signal usable to control one or more external devices in dependence of the classification generated in the computing device 304, as will be described below. In such embodiments the control signal may be made available external of the output device 306 via the communications interface 3062 and in some embodiments the display 3064 then serves no useful purpose and may be omitted.

The system 300 may be implemented using stationary computers, portable electronic devices, laptop or mobile computers, networked or server computers or mainframe computers. Certain functions are described as being performed on a single device but it will be appreciated that it is not the intention to limit the invention to this so that it will be understood that the invention may also be practiced in distributed environments where functionality may be shared among disparate but linked digital processing devices and memory devices, which be local or remote devices. These processing devices and memory devices may be linked through a communications network such as a local area network, a wide area network or the internet. Instructions to be implemented on a suitable processor may be stored on tangible computer readable media such as computer discs, pre-programmed computer chips or removable solid state storage devices (such as USB memory sticks). Additionally or alternatively instructions may be distributed over a network and propagated as a signal in a suitable propagation medium (such as employing electromagnetic or sonic waves).

Transfer of digital information from input device 302 to computing device 304, from computing device 304 to output device 306 and from external the computing device 304 to its system memory 3046 or its processor 3044, indeed any communication of digital information in a system according to the present invention may be via a fixed link such as a hard wired network or a wired telecommunications connection carrying modulated data signals or may be via a wireless link for communicating one or more modulated data signals or carrier waves, such as an radio frequency or an infrared light link.

Figure 4:
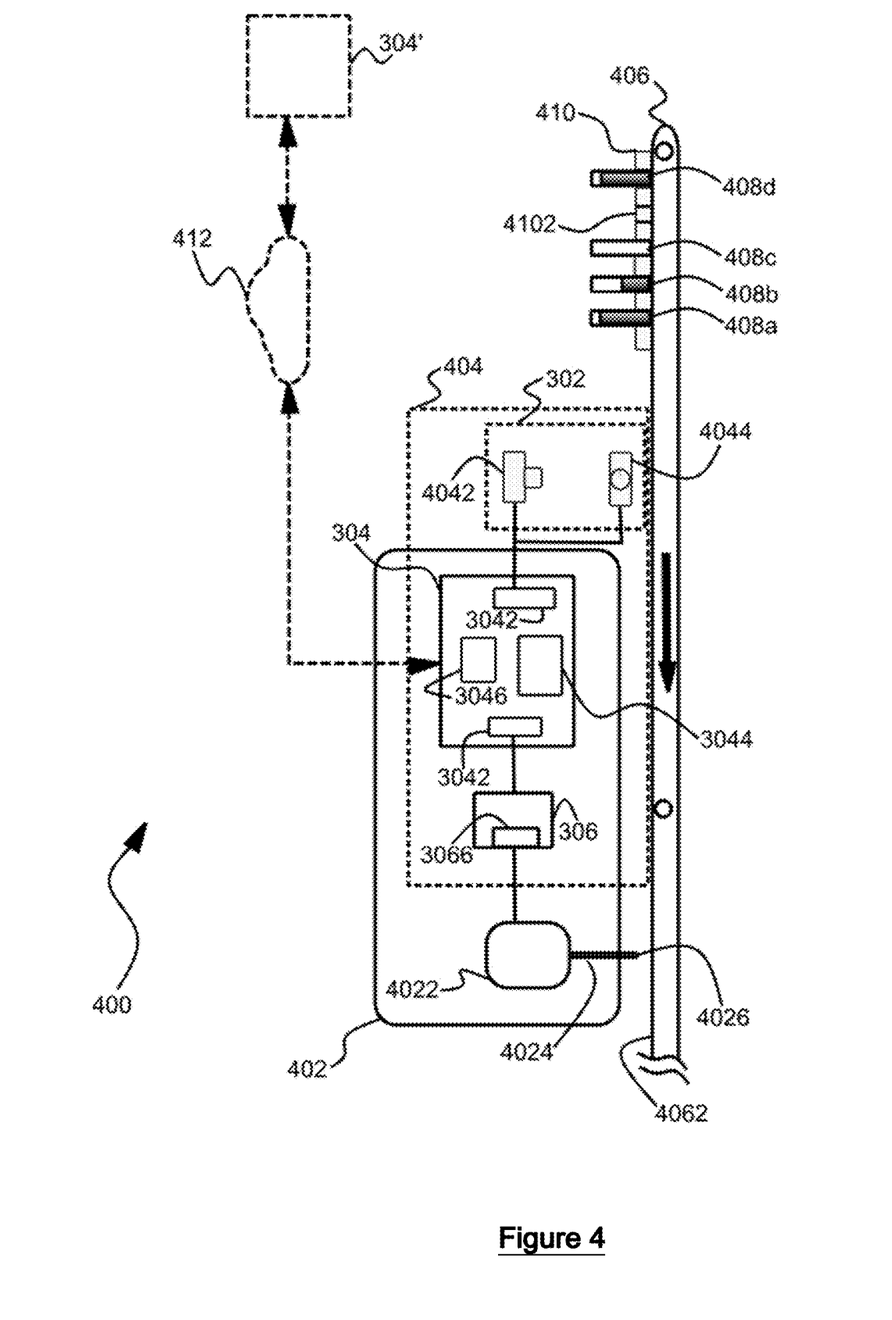
FIG. 4 illustrates schematically a milk analyser according to the present invention.

An example of a milk analyser 400 according to the present invention is illustrated (not to scale) in FIG. 4. The milk analyser 400 comprises a milk analysis unit 402 and a milk classification system 404 in operable connection therewith. The milk analysis unit 402 includes a sample intake system 4022 configured to control the operation of a moveable pipette 4024 through which milk is supplied from a sample container to an analysis modality (not illustrated) within the analysis unit 402. The pipette 4024 is moveable to adjust the height of its tip 4026 above a surface. It will be appreciated that any analysis modality, such as known infra-red spectroscopy or flow cytometry analysis modalities, may be employed within the milk analysis unit 402.

The milk classification system 404 is configured to image milk from the sample container; to generate a classification of the imaged milk using a DLNN classifier, such as the DLNN classifier 200 described above with reference to FIG. 2, trained using labelled milk images from the classes into which the imaged milk may be classified and implemented in a processor of the milk classification system 404; and to control the supply of milk to the analysis unit in dependence of the generated classification.

In the present embodiment the milk analyser 400 is located relative to a conveyor system 406, such as a band conveyor, to position its pipette 4024 above the horizontal surface 4062 of the conveyor system 406 so that when moved it can move into and out of sample containers 408a . . . d retained in a sample rack 410 as they are passed sequentially under the pipette 4024 with movement of the conveyor system 406 in the direction of the arrow illustrated in the FIG. 4. The sample containers 408a . . . d may contain milk (408a, 408b and 408d say), the sample containers may however (408b say) contain an insufficient amount of milk for analysis, the sample containers (408c say) may be empty or the sample containers may be missing and the rack 410 has a vacant holder position (4102 say).

By way of example only and for ease of description, the milk classification system 404 of the present embodiment will be described as comprising the functional elements of the milk classification system 300 already described with above with reference to FIG. 3. The milk classification system 404 therefore comprises an input device 302, a computing device 304 and an output device 306.

The input device 302 in the present embodiment comprises two digital video cameras 4042, 4044. The first digital video camera 4042 is arranged with its field of view vertically downwards and the second digital video camera 4044 is arranged with its field of view intersecting that of the first digital video camera 4042 and perpendicular to the field of view of the first camera 4042, such that any sample container 408a . . . d may be imaged from above by the first digital video camera 4042 and from the side by the second digital video camera 4044. An advantage of imaging from the side is that the presence of a sample container 408a . . . d and optionally a level of milk in the sample container 408a,b,d may be determined in the present embodiment from the image using a DLNN classifier implemented in the computing device 302. An image obtained from above using the first digital video camera 4042 will be processed to a further DLNN classifier which is also implemented in the computing device 304 and which is trained using labelled milk images to make a classification of milk identifying it as being suitable or unsuitable for analysis (i.e. unlikely or likely to cause a blockage) in the milk analyser 400. This further DLNN classifier may for example operate as discussed above with respect to the DLNN classifier 200 of FIG. 2. The two video cameras 4042,4044 of the present embodiment are arranged to image a location upstream of the pipette 4024 (in a direction of movement of the conveyor system 406) and thus upstream of the analysis modality within the milk analysis unit 402 so that any sample container 408a . . . d on the conveyor system 406 will be imaged from above and from the side before it is passed under the pipette 4024.

It will be appreciated that other arrangements of the digital cameras 4042,4044 may be employed so that sample containers may be viewed from different angles or that more or less digital cameras may be used or that other imaging detectors, such as a stills camera or a CCD sensor array, may be substituted for the video cameras 4042,4044 without departing from the invention as claimed. In the present embodiment images are to be obtained in ambient light but in other embodiments the input device 302 may also include one or more illumination sources, which may include sources adapted to generate illumination in specific narrow spectral regions, together with other optical conditioning elements such as one or more optical band-pass filters and/or lenses.

The output device 306 of the classification system here comprises a controller 3066 which generates a control signal dependent on results of the binary classification of the milk generated in the computing device 304. The control signal is output to the sample intake system 4022 which is configured to operate in dependence of this control signal to control the intake of a milk sample into the milk analysis unit 402. In the present embodiment when the generated classification indicates the presence of an unsuitable sample of milk ('BAD' milk) then the control signal generated will be interpreted within the sample intake system 4022 to inhibit the supply of any milk sample from the pipette 4024 to the analysis modality of the milk analysis unit 402.

In some embodiments the control signal may be passed outside of the milk analysis unit 402 to a sorter (not shown) such as a robot arm or a deflector for deflecting sample containers from following the path indicated by the arrow, which operates in response to the control signal to remove from the conveyor system 406 containers, 408b, 408c say, classified as containing an unsuitable or insufficient milk sample and thus inhibit the supply of an unsuitable sample to the analysis modality of the milk analysis unit 402.

In some embodiments, as illustrated in FIG. 4 by the broken line constructions 412,304' the whole or a portion of the DLNN classifier may be implemented in a remote computing device 304'. The images captured by the input device 302 will be transmitted, here using the internet 412, to the remote computing device 304'. The remote computing device 304', as the computing device 304 described above, implements the DLNN classifier to process the captured images and make a binary classification of the images which is passed back as input to the output device 306 for use in constructing the control signal as discussed above. Alternatively, the remote computing device 304' may also construct the control signal and pass this back for use in controlling the uptake of a milk sample into the milk analysis unit 402 (for example via control of the sample intake section 4022 or of a sorter).

Figure 5A:
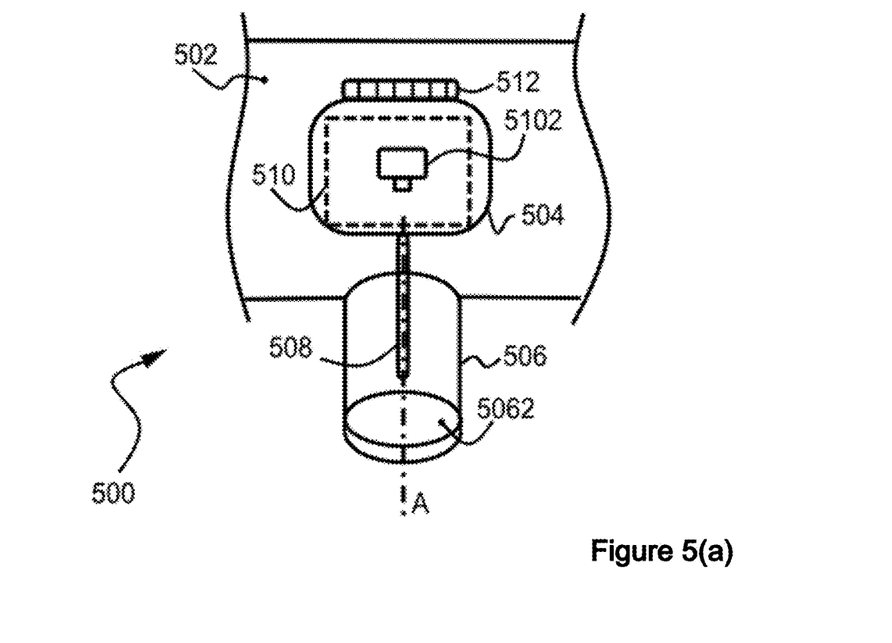
FIGS. 5(a) and 5(b) illustrate schematically a portion of two other embodiments of a milk analyser according to the present invention.

A portion of another embodiment of a milk analyser 500 is illustrated in FIG. 5a. The milk analyser 500 comprises a milk analysis unit 502 (only partially illustrated) which includes a sample intake system 504. The sample intake system 504 comprises a container holder 506 and a moveable pipette 508 through which milk from a sample container (not shown) placed in the container holder 506 is transported to an analysis modality within the milk analysis unit 502. The pipette 508 being movable under control of the sample intake system 504 along an axis A to vary its height above a base 5062 of the container holder 506 and thus to be moveable into and out of contact with milk in a sample container placed in the container holder 506.

An input device 510 of a milk classification system according to the present invention and illustrated above with reference to FIG. 3 is located, at least in part, within the sample intake system 504. The input device 510 here comprises a digital stills camera 5102 configured to obtain images from above a milk sample container placed in the container holder 506.

As discussed above in connection with the milk analyser 400 depicted in FIG. 4, digital image data representing images obtained by the input device 510 is passed to a computing device, for example the computing device 304 of FIG. 3 whereupon, and as described above, one or more processing units of a processor (3044 of FIG. 3 say) executing program code to implement a trained DLNN classifier (200 of FIG. 2 say) processes the digital image data in order to generate a classification of any milk in the image in to a class of a set of classes available to the DLNN classifier. An output device (the output device 306 of FIG. 3 say) receives the classification generated by the computing device and generates an output signal dependent thereon. The output signal is then employed in the milk analysis unit 502 to inhibit the supply of milk into the unit 502. In the present embodiment in addition to or instead of the control signal being used in the sample intake system to control the operation of the pipette 508 to prevent the intake of milk should the control signal be dependent on a classification indicating the absence of a sample of milk (no sample container or an empty sample container or an insufficiently full sample container) and/or the presence of an unsuitable sample of milk ('BAD' milk) the control signal is employed to operate a light 512 and/or other visible or audible signal generator, which constitutes a display (for example display 3064 of FIG. 3) of an output device (for example output device 306 of FIG. 3) of a milk classification system (for example milk classification system 300 of FIG. 3) of the present invention.

Figure 5B:
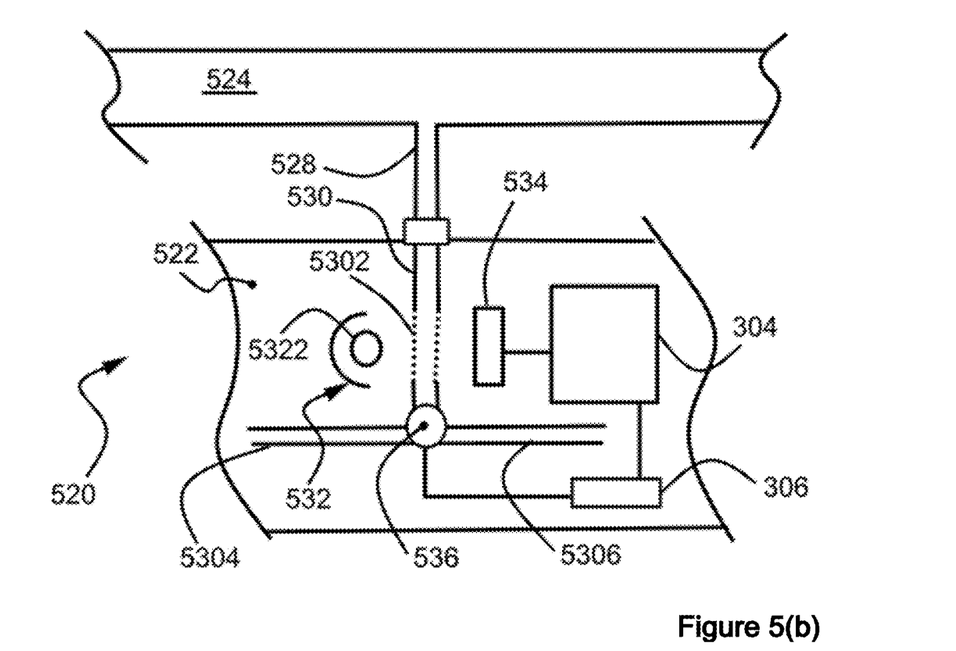

A portion of another embodiment of a milk analyser 520 is illustrated in FIG. 5b. In the present embodiment the classification system will be described with reference to the milk classification system 300 illustrated in FIG. 3 and described above with reference to that figure.

The milk analyser 520 comprises a milk analysis unit 522 (only partially illustrated) in liquid communication with milk in a flow line 524 (or other bulk milk source) via a by-pass conduit 528. The by-pass conduit 528 is connected, in some embodiments releasably connected, with internal flow conduit 530 in the milk analysis unit 522. An illumination source 532 and a detector array 534 cooperate to form a part of an input device of a classification system according to the present invention. The illumination source may comprise a plurality of individual light generators 5322 each of which may emit the same or different wavelengths of light and each of which may be energised to emit light in any sequence, for example individually in series or in combinations or simultaneously, in order to provide an illumination of a desired wavelength profile. The detector array 534 in some embodiments may comprise, in a known way, a matrix of individually addressable sensor elements, the outputs of which are dependent on the intensity of illumination incident on a photosensitive surface and has a value which can for example range from 0 to 256. These values for the individual sensor elements are propagated to populate the cells of a suitably dimensioned input matrix array M of a DLNN classifier according to the present invention (the DLNN classifier 200 of FIG. 2 say) implemented in a computing device (the computing device 304 say) of the classification system 300.

In the present embodiment the illumination source 532 and the detector array 534 are located opposing one another across a transparent section 5302 of the internal flow conduit 530 so that the detector array 534 will generate a transmission image of milk in the transparent section 5302.

A multi-way valve 536 is located at a junction of the internal flow conduit 530 and is controllable to select the flow of milk in the conduit 530 into either a first branch 5304 or a second branch 5306 of the internal flow conduit 530. The first branch 5304 may be connected to a waste (not shown) and the second branch 5306 may be connected to an analysis modality (not shown) within the milk analysis unit 522.

In common with the milk classification system 300 the computing device 304 comprises a processor having one or more processing units on which program code is executed to implement a DLNN classifier, such as that classifier 200 illustrated in FIG. 2 and described above, trained to make a binary classification of milk samples represented in digital image data generated by the detector array 534.

An output from the computing device 304 dependent of the classification generated by the computing device 304 is passed to an output device (the output device 306 say) which is adapted to generate a control signal responsive to the output from the computing device 304 for use in controlling the operation of the multi-way valve 536. In the event that the classification generated by the DLNN classifier implemented in the computing device 304 is associated with the milk represented in the image data being unsuitable for analysis then the multi-way valve 536 is controlled in response to the control signal transmitted from the output device 306 to permit flow of milk through the first branch 5304 and not the second branch 5306. Conversely, should the classification be associated with suitable milk then the multi-way valve 536 is controlled in response to the control signal transmitted from the output device 306 to permit flow of milk through the second branch 5306 and not the first branch 5304.

Figure 6:
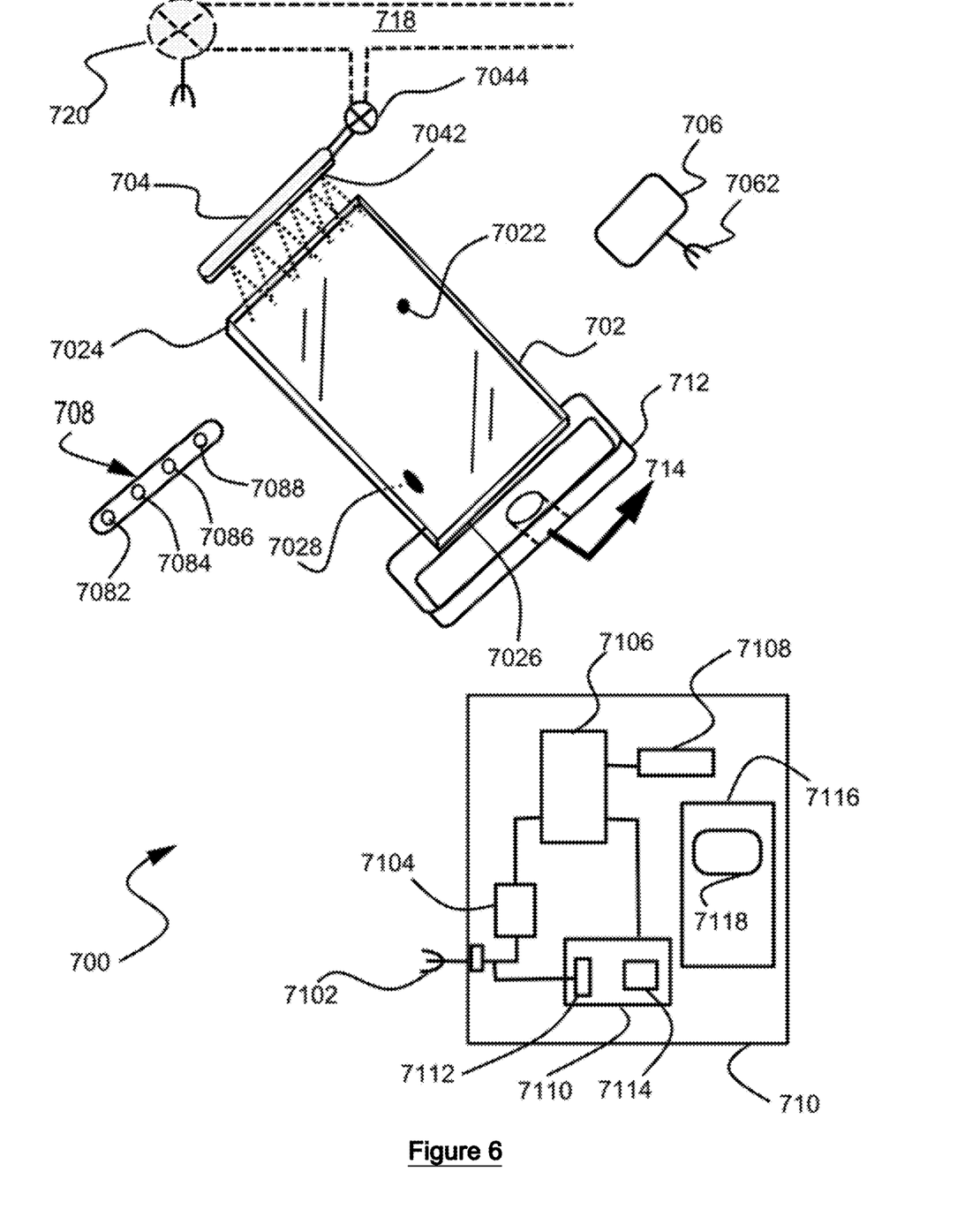
FIG. 6 illustrates another embodiment of the milk classification system according to the present invention.

FIG. 6 illustrates a further embodiment of a milk classification system according to the present invention, for example the classification system 300 of FIG. 3, realised as a bulk milk tester 700, for example located on a farm or at a milk receival station to screen bulk milk. The bulk milk tester 700 comprises a transparent imaging stage 702; a spray unit 704; a digital image generator, here a digital camera (stills or video) 706; illumination source 708 which may comprise a plurality of individual light generators 7082, 7084, 7086, and 7088; and a computing device 710, which may comprise a personal computer, such as a stationary computer or a laptop, or which may be a dedicated computing device or which may be a remote computing device connected via a telecommunications network.

The spray unit 704 comprises an array (here a linear array of six nozzles) of nozzles (7042 for example) arranged to spray milk across the width (or a portion thereof) of an upper surface 7022 of the transparent imaging stage 702, here towards a first end 7024 thereof. The milk, when sprayed onto the surface 7022 moves in a thin layer over the surface 7022 and towards a second end 7026 of the transparent imaging stage 702 whereupon the milk leaves the imaging stage 702 and, in the present embodiment, is collected in a trough 712, which in some embodiments is collected to a waste system 714, in some embodiments selectively connected to the waste system 714 or to a return line to return milk in the trough 712 for further use. In order to aid the movement of the sprayed milk over the upper surface 7022 the transparent imaging stage 702 may, as is illustrated for the present embodiment, may be located with its upper surface 7022 at an angle to the horizontal. The spray unit 704 is connectable to a source of milk 718, which in the present embodiment is a bulk milk flow line, via an inlet, here a flow control valve 7044.

The digital camera 706 is located on one side of the transparent imaging stage 702 to have its field of view to include at least a portion of the milk as it moves as a thin layer over the upper surface 7022. The illumination source 708 is arranged on an opposite side of the transparent imaging stage 702 to illuminate at least the portion of milk in the field of view of the digital camera 706 through a lower surface 7028 of the transparent imaging stage 702, opposite the upper surface 7022. The digital camera 706 and the illumination source 708 cooperate to generate digital image data by the digital camera 706 detecting light transmitted from the illumination source 708 and through the thin layer of milk on the upper surface 7022 of the transparent imaging stage 702.

The digital camera 706 may be provided with a communications interface, here wireless interface 7062 via which generated digital milk image data is provided to the computing device 710. A communications interface, here wireless interface 7102, of the computing device 710 receives the digital milk image data generated by the digital camera 706 and provides it to an internal storage 7104 of the computing device where it is held available for processing by a processor 7106, which may comprise one or more processing units such as a central processing unit (CPU) and/or a graphical processing unit (GPU) of the computing device 710 suitably configured to implement a DLNN classifier according to the present invention trained to classify milk as belonging to one of a plurality of classes, such as the DLNN classifier 200 described above.

In some embodiments the transparent imaging stage 702 may be omitted and the digital camera 706 and illumination source 708 may be arranged to generate transmission images through milk in free-space, such as milk which is sprayed as a curtain from the spray unit 704.

Program code is obtained into a system memory 7108 of the computing device 710 either from the internal storage 7104 or from external the computing device 710 via its communications interface 7102, such as from a remote server/storage facility via the Internet. The processor 7106 executes this program code and is caused to implement the DLNN classifier, DLNN classifier 200 say, to classify milk in the input image data stored in the internal storage 7104 as being either GOOD or BAD (or otherwise acceptable or not or some other binary classification). Analogous to the output device 306 of the system 300, an output device 7110 in the present embodiment comprises a control signal generator 7112 and a display adapter 7114, both of which are adapted to generate control signals dependent on the classification generated by the DLNN classifier, DLNN classifier 200 say, implemented in the processor 7106. The control signal generator 7112 is configured to generate a control signal for the control of an external device. In the present embodiment the control signal generator is connected to the wireless communications interface 7102 to transmit the control signal to, by way of example only, a shut-off valve 720 which regulates the flow of milk through the bulk milk flow line 718. The display adapter 7114 is configured generate a display control signal to cause a visual display unit 7116 of the computing device to display a label 7118 in response to the classification that was generated by the DLNN classifier.

For example, in the event the DLNN classifier implemented by processor 7106 classifies the milk in the digital milk image data as being unsuitable (for example spoiled) the control signal generator 7112 may operate to generate a control signal to close the shut-off valve 720 to prevent the flow of milk in the line 718 (to say a storage container or transporter) whilst the display adapter operates to automatically generate one or messages based on the classification, say a warning label 7118 (such as HALT or STOPPED) which is displayed on the visual display unit 7116 and may serve to alert a user to an undesirable condition of the milk being imaged.

It will be appreciated that whilst aspects of the invention may have been be described above in the general context of computer-executable instructions, such as routines executed by a general-purpose data processing device, for example a personal computer, those skilled in the relevant art will appreciate that the invention can be practiced with other communications, data processing, or computer system configurations, including: wireless devices, multi-processor systems, network PCs, mini-computers, mainframe computers, and the like.

While aspects of the invention, such as certain functions, are described as being performed exclusively on a single device or unit, the invention can also be practiced in distributed environments where functionality is shared among disparate processing devices and across several devices or units. The disparate processing devices, units and devices may be linked through a communications network, such as a Local Area Network (LAN), Wide Area Network (WAN), or the Internet, or may be in hard-wired communication.

The program code for implementing the DLNN classifier of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively the program code and other data related to the invention may be distributed over the Internet or over other networks (including wireless networks), on a propagated signal on a propagation medium such as an electromagnetic wave.

Modules, units and devices constituting embodiments of the present invention may be integrated in some instances and in other instances some or all may be interconnected individual modules, units and devices.

The invention claimed is:
1. A milk analyser, comprising:
 a milk analysis unit, having an analysis modality configured to analyze at least a sample of milk;
 an input device having an imaging device configured to image milk to generate of digital image data;
 a computing device configured to execute a program code to implement a deep learning neural network classifier trained using milk images labelled with a class from a set of classes according to class characteristics which are manifest visually in the imaged milk, the computing device configured to process the digital image data using the deep learning neural network classifier to assign the imaged milk to a particular assigned class of the set of classes; and a control signal generator configured to output a control signal based on the particular assigned class to control a supply of milk to the milk analysis unit to be analyzed.

2. The milk analyser of claim 1, wherein the milk analysis unit includes a sample intake system configured to selectively inhibit a flow of milk to the analysis modality in response to the control signal.

3. The milk analyser of claim 2, wherein the sample intake system includes a moveable pipette configured to move in response to the control signal.

4. The milk analyser of claim 2, wherein the sample intake system includes a flow conduit and a valve connected to the flow conduit, the flow conduit configured to direct the flow of milk to the valve, the valve configured to control the flow of milk to flow to a selected branch conduit of a plurality of branch conduits in response to the control signal.

5. The milk analyser of claim 4, wherein
the flow conduit includes a transparent section, and
the imaging device is configured to image milk located within the transparent section.

6. A method, comprising:
receiving, at a processor, digital image data comprising a representation of milk to be classified;
processing the digital image data based on implementing a first deep learning neural network classifier to generate a classification for milk represented in the digital image data as belonging to a particular class in a set of classes, wherein the first deep learning neural network classifier is trained using a training data set comprising digital representations of milk images wherein each image is labelled with an associated milk class; and
generating an output signal based on the generated classification to cause at least one of
causing one or more messages to be displayed on a display screen, or
causing a supply of milk to an analysis modality of a milk analyser unit to be selectively controlled to selectively control analyzing of the supply of milk,
wherein the processing the digital image data to generate the classification for milk represented in the digital image data as belonging to the particular class includes
processing the digital image data using the first deep learning neural network classifier to extract a feature vector for the digital image data,
processing the extracted feature vector using the first deep learning neural network classifier to determine probabilities that include, for each class of the set of classes, a separate probability of the extracted feature vector belonging to that class, and
processing the determined probabilities using the first deep learning neural network classifier to generate the classification for the milk represented in the digital image data as belonging to the particular class of the set of classes based on the determined probabilities,
wherein the processing the digital image data to generate the classification for milk represented in the digital image data as belonging to the particular class is selectively performed in response to processing the digital image data to classify an image represented in the digital image data as including the representation of milk to be classified.

7. The method of claim 6, wherein the processing the digital image data to classify the image represented in the digital image data as including the representation of milk to be classified further includes processing the digital image data based on implementing a second deep learning neural network classifier to determine whether a representation of a sample container is present in the digital image data,
selectively processing the digital image data based on implementing a third deep learning neural network classifier to determine whether the representation of milk to be classified is present in the digital image data, in response to identifying that the representation of the sample container is present in the digital image data, and
selectively performing the processing the digital image data using the first deep learning neural network classifier to extract the feature vector for the digital image data, in response to identifying that the representation of milk to be classified is present in the digital image data.

8. The method of claim 7, wherein the first deep learning neural network classifier, the second deep learning neural network classifier, and the third deep learning neural network classifier are a same deep learning neural network classifier.

9. The method of claim 6, wherein the generating the output signal causes a sorter to selectively separate a particular sample of milk from other samples of an array of samples of milk.

10. The method of claim 6, wherein the generating the output signal causes a moveable pipette of the milk analyser unit to move.

11. The method of claim 6, wherein
the milk analyser unit includes a sample intake system that includes a flow conduit and a valve connected to the flow conduit, the flow conduit configured to direct a flow of milk to the valve, and
the generating the output signal causes the valve to control the flow of milk to flow to a selected branch conduit of a plurality of branch conduits.

12. A milk classification system, comprising:
an input device having an imaging device configured to image milk to generate digital image data;
a computing device configured to execute a program code to process the digital image data based on implementing a first deep learning neural network classifier to generate a classification for milk represented in the digital image data as belonging to a particular class in a set of classes, wherein the first deep learning neural network classifier is trained using a training data set comprising digital representations of milk images wherein each image is labelled with an associated milk class; and
an output device including a control signal generator configured to output a control signal based on the particular class to control a supply of milk to a milk analysis unit having an analysis modality configured to analyze at least a sample of milk.

13. The milk classification system of claim 12, wherein the input device includes:
a transparent imaging stage;
a spray unit, the spray unit including an array of nozzles configured to spray milk across at least a portion of a width of an upper surface of the transparent imaging stage, such that at least a portion the milk moves as a thin layer over the upper surface;
a digital image generator on the upper surface of the transparent imaging stage, the digital image generator configured to have a field of view that includes at least the portion of the milk moving as the thin layer over the upper surface; and an illumination source on a lower surface of the transparent imaging stage such that the illumination source and the digital image generator are on opposite sides of the transparent imaging stage, the illumination source configured to illuminate at least the portion of milk in the field of view of the digital image generator through the lower surface of the transparent imaging stage.

14. The milk classification system of claim 13, wherein the upper surface of the transparent imaging stage is at an angle to horizontal.

15. The milk classification system of claim 12, wherein the processing the digital image data to generate the classification for milk represented in the digital image data as belonging to the particular class includes process the digital image data using the first deep learning neural network classifier to extract a feature vector for the digital image data, process the extracted feature vector using the first deep learning neural network classifier to determine probabilities that include, for each class of the set of classes, a separate probability of the extracted feature vector belonging to that class, and process the determined probabilities using the first deep learning neural network classifier generate the classification for the milk represented in the digital image data as belonging to the particular class of the set of classes based on the determined probabilities.

16. The milk classification system of claim 15, wherein the processing the digital image data to generate the classification for the milk represented in the digital image data as belonging to the particular class is selectively performed in response to processing the digital image data to classify an image represented in the digital image data as including a representation of milk to be classified.

17. The milk classification system of claim 16, wherein the processing the digital image data to classify the image represented in the digital image data as including the representation of milk to be classified further includes process the digital image data based on implementing a second deep learning neural network classifier to determine whether a representation of a sample container is present in the digital image data, selectively process the digital image data based on implementing a third deep learning neural network classifier to determine whether the representation of milk to be classified is present in the digital image data, in response to identifying that the representation of the sample container is present in the digital image data, and selectively perform the processing the digital image data using the first deep learning neural network classifier to extract the feature vector for the digital image data, in response to identifying that the representation of milk to be classified is present in the digital image data.

18. The milk classification system of claim 17, wherein the first deep learning neural network classifier, the second deep learning neural network classifier, and the third deep learning neural network classifier are a same deep learning neural network classifier.

* * * * *